(12) United States Patent
Aizawa et al.

(10) Patent No.: US 6,900,559 B2
(45) Date of Patent: May 31, 2005

(54) ROTOR MAGNET, MOTOR AND STEPPING MOTOR

(75) Inventors: Masami Aizawa, Chiba-ken (JP); Akihiro Ito, Chiba-ken (JP)

(73) Assignee: SEIKO Precision Inc., Chiba-ken (JP)

( * ) Notice: Subject to any disclaimer, the term of this patent is extended or adjusted under 35 U.S.C. 154(b) by 0 days.

(21) Appl. No.: 09/767,459

(22) Filed: Jan. 23, 2001

(65) Prior Publication Data
US 2001/0024068 A1 Sep. 27, 2001

(30) Foreign Application Priority Data
Mar. 24, 2000 (JP) ........................................ 2000-084649

(51) Int. Cl.[7] ........................ H02K 15/03; H02K 15/10; H02K 15/12
(52) U.S. Cl. ........................................ 310/45; 310/44
(58) Field of Search .............................. 310/43, 44, 45, 310/85, 156.38, 49 R, 156.43, 156; 148/101–104, 302; 264/104, 113, 126; 252/62.54; 419/12, 35; 29/598

(56) References Cited

U.S. PATENT DOCUMENTS

| | | | | |
|---|---|---|---|---|
| 4,065,234 A | * | 12/1977 | Yoshiyuki et al. | 310/103 |
| 4,088,909 A | * | 5/1978 | Matsumura et al. | 310/49 R |
| 4,250,421 A | * | 2/1981 | Masuda et al. | 310/156 |
| 4,763,034 A | * | 8/1988 | Gamble | 310/181 |
| 5,137,587 A | * | 8/1992 | Schultz et al. | 148/103 |
| 5,221,503 A | * | 6/1993 | Ward et al. | 310/156 |
| 5,298,826 A | * | 3/1994 | Lee et al. | 310/156 |
| 5,359,248 A | * | 10/1994 | Nagate et al. | 310/156 |
| 5,521,451 A | * | 5/1996 | Oudet et al. | 310/266 |
| 5,580,400 A | * | 12/1996 | Takahashi | 148/302 |
| 5,650,021 A | * | 7/1997 | Takahashi | 148/104 |
| 5,684,352 A | * | 11/1997 | Mita et al. | 310/156 |
| 5,728,232 A | * | 3/1998 | Takahashi | 148/105 |
| 5,780,944 A | * | 7/1998 | Sakamoto | 310/49 R |
| 5,843,567 A | * | 12/1998 | Swift et al. | 428/221 |
| 6,144,130 A | * | 11/2000 | Kawamura | 310/156 |
| 6,163,091 A | * | 12/2000 | Wasson et al. | 310/12 |

FOREIGN PATENT DOCUMENTS

| | | | | |
|---|---|---|---|---|
| CN | 11253 | * | 6/1996 | H01F/1/08 |
| JP | 58-9566 | * | 1/1983 | |
| JP | 361186402 | * | 8/1986 | H01F/1/08 |
| JP | 361210857 | * | 9/1986 | H02K/21/08 |
| JP | 404338603 | * | 11/1992 | |
| JP | 4-364702 | * | 12/1992 | |
| JP | 05299221 | * | 11/1993 | |
| JP | 5-299221 | * | 11/1993 | |
| JP | 409129427 | * | 5/1997 | |
| JP | 410303010 | * | 11/1998 | |
| JP | 11283817 | * | 10/1999 | H01F/1/08 |
| JP | 411283817 | * | 10/1999 | |

OTHER PUBLICATIONS

Microstructural Changes with N Content in Sm–Fe–N Alloys The Journal of the Magnetics Society of Japan, pp. 201–204, vol. 18, No. 2, 1994.

* cited by examiner

*Primary Examiner*—Tran Nguyen
(74) *Attorney, Agent, or Firm*—Jordan and Hamburg LLP

(57) ABSTRACT

To provide a rotor magnet which is small in size and provided with high magnetic energy, a rotor magnet is formed by adding a SmFeN magnetic powder to a binder such as a polyaxnide. The SmFeN magnetic powder is provided in a size of about one-tenth that of an NdFeB magnetic powder. Therefore, the density of the magnetic powder in the magnet can be made uniform. Accordingly, there is not any dispersion of the magnetic poles when a number of poles are magnetized and the magnet can be made smaller since the maximum energy product of the magnet is higher than that of an SmCo series magnet.

2 Claims, 2 Drawing Sheets

US 6,900,559 B2

ROTOR MAGNET, MOTOR AND STEPPING MOTOR

BACKGROUND OF THE INVENTION

1. Field of the Invention

The present invention relates to a rotor magnet and a motor.

2. Description of the Related Art

As is well known, use of a permanent magnet is widely diversified and in the use, a permanent magnet maintains an important position as a constituent element of an electronic apparatus, particularly, a small-sized motor, particularly as a rotor magnet. The performance of a permanent magnet has been advanced year by year and a magnetic material thereof, has been changed from an alnico magnet to a ferrite magnet, further, in recent years, materials having a larger magnetic flux density such as a samarium-cobalt (SmCo) series magnet or a neodymium-iron-boron (NdFeB) series magnet have been adopted.

It is well-known that as these permanent magnets a sintered body constituted by sintering a composite body derived from metal elements or a resin bonded magnet constituted by kneading both of a magnetic powder and a resin powder with the resin powder as a binder and molding a mixture thereof have been employed. See Japanese Patent Publication No. 87634/1994.

Generally, a magnetic property of a magnetically anisotropic magnet is regarded to be higher than that of a magnetically isotropic magnet. A maximum energy product (BHmax) of an anisotropic NdFeB series magnet is larger than that of an anisotropic SmCo series magnet and therefore, higher magnetic energy can be provided even when the magnet is formed in a small shape and the magnet can be downsized when the same magnetic energy is intended to be obtained. In a different view, in the case of using the magnet of the anisotropic SmCo series, the magnet cannot be downsized in comparison with the anisotropic NdFeB series magnet.

However, when the anisotropic NdFeB series magnet is used as a rotor magnet for a motor, since a magnetic powder thereof is large (size: 100 through 200 µm), there causes a dispersion in a density of the magnetic powder in the magnet and accordingly, there causes a dispersion in magnetic fluxes generated at respective poles.

That is, when a rotor magnet is intended to be downsized, there poses a problem in which there is increased a dispersion in poles of a rotor which should not be present in the motor.

SUMMARY OF THE INVENTION

In order to resolve the above-described problem, a rotor magnet for a motor according to the invention is constituted by mixing a magnetic powder of SmFeN in a resin binder and molding a mixture thereof in a desired shape. Further, a motor according to the invention is provided with a rotor including the above-mentioned rotor magnet. Therefore, the rotor and the motor can be downsized while achieving promotion in accuracy in positions of poles in the rotor.

DETAILED DESCRIPTION OF A PREFERRED EMBODIMENT

Figure 1:
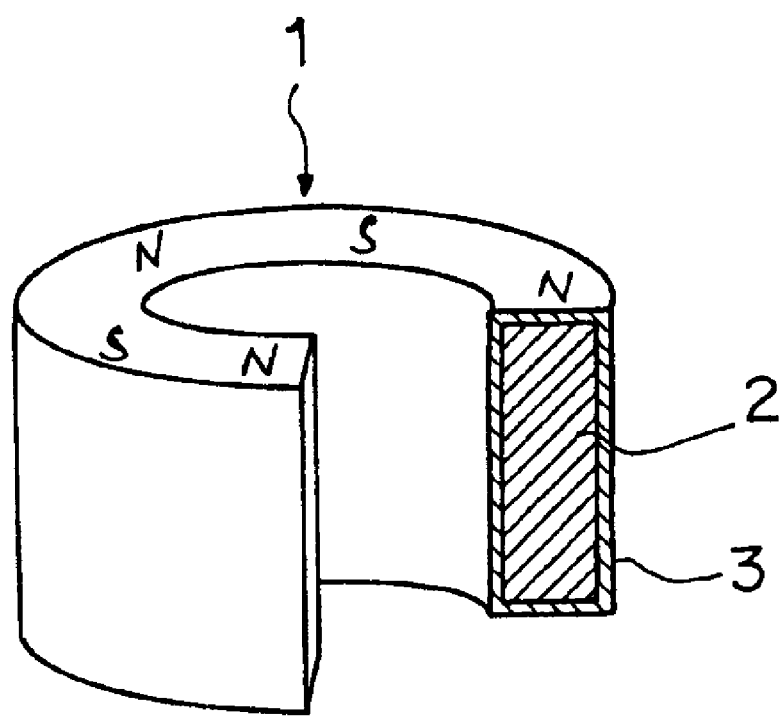
FIG. 1 is a partially broken perspective view of an embodiment according to the invention.

An explanation will be given of an embodiment of the invention as follows. FIG. 1 shows a rotor magnet for a stepping motor constituted by forming the rotor magnet in a cylindrical shape. A material of the rotor magnet used in the invention, has been produced by kneading a powder of an anisotropic SmFeN (generally, referred to as iron samarium nitride, samarium iron nitrogen or samarium iron nitride and the like) with an epoxy resin or polyamide resin as a binder followed by molding. A metal having a low melting point (Zn, Pb or solder) can be used as a binder in some cases. A powder of anisotropic SmFeN (magnetic powder) has a granular shape and its size is about 10 µm at maximum. Incidentally, anisotropic NdFeB series magnetic powder, the above-mentioned, is in blocks and the size of the powder is 100 through 200 µm. That is, the size of the anisotropic SmFeN magnetic powder is 1/10 through 1/20 of the size of anisotropic NdFeB series magnetic powder. In the rotor magnet according to the invention the magnetic powder is packed densely and uniformly since the particle size of the magnetic powder is small.

The density of the rotor magnet is about 4.8 g/cm$^3$ and is smaller than the density 5.4 g/cm$^3$ of the rotor magnet of the anisotropic NdFeB series. The fact is effective in an increase in pull-in torque, a decrease of the weight of a motor and a reduction in inertia thereof.

In the present embodiment, a bonded magnet produced by kneading 91 wt % of the anisotropic SmFeN magnetic powder, 9 wt % of polyamide resin as a binder and a reforming material, followed by injection-molding in a magnetic field, has been used as a rotor magnet. The composition of the above-mentioned anisotropic SmFeN magnetic powder is almost as follows, Sm (samarium) of 22 wt %, Fe (iron) of 67 wt % and N (nitrogen) of 2 wt %. The volume content of the magnetic powder of the magnet is 56.9% and the maximum energy product (BHmax) is 100.03×10$^3$ J/m$^3$ (joule per cubic meter). Further, the surface magnet flux of the magnet is about 0.35 T (tesla) when the magnet is magnetized in four poles. Incidentally, the maximum energy product of a magnet including 93 wt % of the anisotropic SmCo1-5 series magnetic powder is about 64×10$^3$ J/m$^3$ (joule per cubic meter).

As shown by FIG. 1, the rotor magnet 1 was constituted by forming a coating 3 on an entire surface of the above-mentioned molded product 2, by a rust resistant treatment. In forming the coating 3 on the surface, there was used a paint including a phosphate among epoxy resin type baking type paints, as a metal use primer corrosion resistant paint. Specifically, as a paint including a phosphate, there was used a paint including aluminum phosphate as a corrosion resistant pigment (hereinafter, referred to as "aluminum phosphate type coating"), the coating was formed on the entire surface of the molded product 2 and the coated product 2 was sintered for 1 through 2 hours at 125° C. to thereby adhere the coating onto the surface of the magnet. As a result, there was provided the rotor magnet 1 having the corrosion resistant coating 3 having luster on the surface.

When the structure of a section of the rotor magnet 1 was enlarged and examined, although the structure differed depending on the position of the surface, one coating gave a thickness of the coating 3 of 20 through 40 µm, two coating gave, the thickness of 40 through 80 µm and no peeling off of the coating or cracks were found.

Next, the rotor magnet 1 was immersed in a physiological salt solution at normal temperature and presence or absence of occurrence of rust was investigated; even after 120 days, occurrence of rust was not found at all. Incidentally, in the case in which a general epoxy type resin paint was coated on a surface of a magnet of the same kind, rust was produced after three days in a similar experiment. Further, the rotor magnet 1 immersed in 10% hydrochloric acid solution constituting a severer environment, the rotor magnet 1 remained unchanged for 20 days.

It is considered that the reason why the rust resistant effect was so high as described above is, because the bonding between the SmFeN magnet and the aluminum phosphate type paint is very good. That is, an unstable Fe present in the Fe component included in the SmFeN magnet is thought to be the cause of occurrence of rust, and by the chemical reaction through the coating treatment using the paint including the phosphate for rust resistance, a dense phosphate coating excellent in corrosion resistance and adhering property is formed.

The chemical reaction of the phosphate coating treatment, described above, is shown by following chemical equations.

$$3Al(H_2PO_4)_2 \leftrightarrow 3AlHPO_4 + 3H_3PO_4 \quad (1)$$

$$3AlHPO_4 \leftrightarrow Al_3(PO_4)_2 + H_3PO_4 \quad (2)$$

$$Fe + H_3PO_4 \leftrightarrow Fe(H_2PO_4)_2 + H_2 \uparrow \quad (3)$$

$Fe(H_2PO_4)_2$ (iron hydrogenphosphate) in the above-described chemical equation (3) constitutes a coating having high adhering performance and excellent in corrosion resistance.

Figure 2:
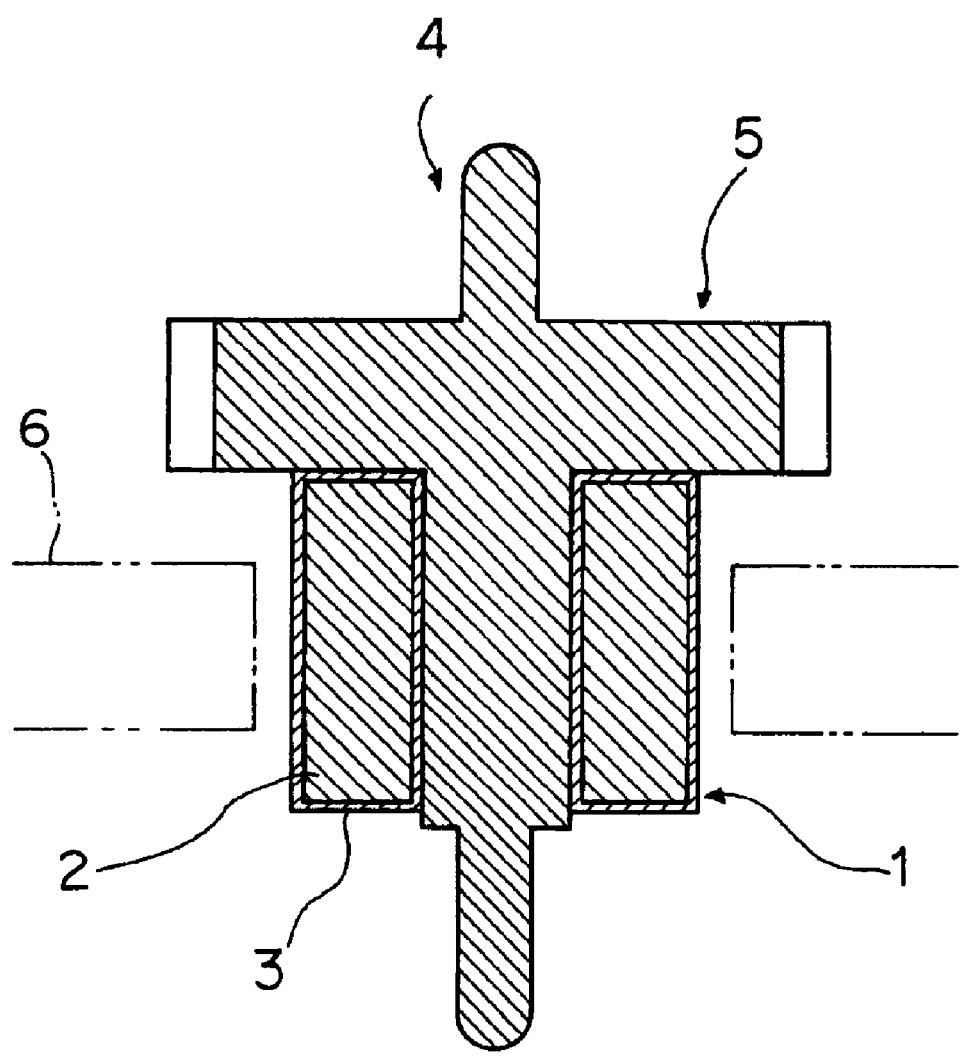
FIG. 2 is a sectional view showing a state in which a rotor magnet according to an embodiment of the invention is integrated to a rotor for a stepping motor.

FIG. 2 shows an example in which the above-described rotor magnet 1 is integrated as a rotor magnet of a rotor 4 for a small-sized stepping motor. The rotor 4 is made by press-fitting a shaft portion of a rotor pinion 5 comprising a hard plastic molded product into the rotor magnet 1.

The rotor magnet 1 acquires a very large magnetic flux density as mentioned above and therefore, when it is magnetized in a state of a single member thereof, the magnets are sucked to each other, it is troublesome to separate the magnets and accordingly, normally, magnetizing is carried out after integrating the both members. With regard to polarities of the magnet, the magnet is magnetized in N poles and S poles alternately on a circumference formed in a ring-like shape.

The rotor 4 is made rotatable by alternately switching excitation polarities of a stator 6 provided to surround the rotor magnet 1.

Further, the ratio of the components of the anisotropic SmFeN magnet used in the above-described embodiment is only an example and an anisotropic SmFeN magnet having other ratios of the components can be used as well. Further, with regard to a paint including phosphate for rust resistance, in place thereof, there can be used a paint including, for example, zinc phosphate. Further, when the paint including zinc phosphate is used, only aluminum in the above-described chemical equations is replaced by zinc and naturally, formation of $Fe(H_2PO_4)_2$ having high adhering property and excellent in corrosion resistance remains unchanged.

The rotor magnet according to the invention is constituted by mixing the magnetic powder of SmFeN with the resin binder and molding the mixture in a desired shape. Therefore, in comparison with the conventional anisotropic rare earth magnet, the magnetic powder is fine, the magnetic powder is uniformly packed and accordingly, the pitch of magnetization can be reduced and a motor magnet having a small diameter and a number of poles can be produced.

Further, the maximum energy product is larger than that of the constitution using the anisotropic SmCo magnetic powder and even when the rotor magnet is downsized, the characteristic of the motor can be prevented from being deteriorated.

Downsizing the rotor magnet amounts to downsizing the motor as a whole. Further, the number of coil wirings can be increased by an amount of downsizing the rotor magnet and accordingly, there is provided magnetomotive force larger than that in the constitution before downsizing the rotor, which therefore amounts to an increase in torque of the motor.

Therefore, according to the invention, by using the SmFeN magnetic powder having large magnetic energy and fine magnetic powder, there can be realized a rotor magnet which is downsized without reducing an output of the motor and thereby is achieved an effect amounting to downsizing and high torque formation of the motor.

What is claimed is:

1. A rotor magnet comprising a cylindrical shaped molded body of a mixture of magnetic powder of SmFeN and a resin binder, said molded body having at least one North pole and at least one South pole at alternating positions along a circumference of the molded body, said magnetic powder is in the form of particles of a size not greater than 10 $\mu$m and uniformly and densely packed, said rotor has a phosphate coating an outside surface of the molded body, wherein said phosphate coating is an iron-hydrogen phosphate coating sintered at lower temperature than a decomposition temperature of SmFeN alloys, and is combined with an unstable Fe of the Fe component included in the molded body.

2. A motor comprising:

a stator; and a rotor magnet, said rotor magnet having a cylindrical shaped molded body of a mixture of magnetic powder of SmFeN and a resin binder, said molded body having at least one North pole and at least one South pole at alternating positions along a circumference of the molded body;

said magnetic powder is in the form of particles of a size not greater than 10 $\mu$m and uniformly and densely packed, said rotor has a phosphate coating covering an outside surface of the molded body, wherein said phosphate coating is an iron-hydrogen phosphate coating sintered at lower temperature than a decomposition temperature of SmFeN alloys, and is combined with an unstable Fe of the Fe component included in the molded body.

* * * * *